(12) United States Patent
Kuras et al.

(10) Patent No.: US 7,192,374 B2
(45) Date of Patent: Mar. 20, 2007

(54) SYSTEM AND METHOD FOR CONTROLLING A CONTINUOUSLY VARIABLE TRANSMISSION

(75) Inventors: Brian Dean Kuras, Metamora, IL (US); Thomas Michael Sopko, Jr., East Peoria, IL (US); Maria-Magdalena Dilimot, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 160 days.

(21) Appl. No.: 10/865,929

(22) Filed: Jun. 14, 2004

(65) Prior Publication Data

US 2005/0277501 A1    Dec. 15, 2005

(51) Int. Cl.
*F16H 3/72*     (2006.01)

(52) U.S. Cl. ......................................... 475/153; 477/15

(58) Field of Classification Search .................. 477/37, 477/115, 15; 903/918, 942; 475/153
See application file for complete search history.

(56) References Cited

U.S. PATENT DOCUMENTS

| 6,385,970 | B1* | 5/2002 | Kuras et al. .................. 60/448 |
| 6,424,902 | B1 | 7/2002 | Kuras et al. |
| 2003/0151381 | A1* | 8/2003 | Kadota et al. .............. 318/465 |
| 2005/0080537 | A1* | 4/2005 | Cawthorne et al. ........... 701/51 |
| 2005/0255963 | A1* | 11/2005 | Hsieh et al. ................... 477/3 |
| 2005/0256629 | A1* | 11/2005 | Tao et al. ..................... 701/87 |

* cited by examiner

*Primary Examiner*—Sherry Estremsky
(74) *Attorney, Agent, or Firm*—Finnegan, Henderson, Farabow, Garrett & Dunner (57) ABSTRACT

A method of controlling a continuously variable transmission includes sensing an output speed of a motor, determining an upper speed limit based on the output speed of the motor and a positive torque limit associated with the motor, determining a limited motor speed command based on the lesser of a motor speed command and the upper speed limit, and controlling the motor based on the limited motor speed command.

20 Claims, 5 Drawing Sheets

SYSTEM AND METHOD FOR CONTROLLING A CONTINUOUSLY VARIABLE TRANSMISSION

TECHNICAL FIELD

This disclosure relates generally to a continuously variable transmission, and more specifically to a system and method for controlling a continuously variable transmission.

BACKGROUND

Many automobiles and work machines, particularly, earth working machines, use a continuously variable transmission (CVT) to drive wheels or tracks for propulsion. An engine provides power to the transmission, which controls the speed and torque applied to the wheels or tracks. The transmission can increase output torque by decreasing the output speed. A transmission can also decrease output torque by increasing the output speed.

A manual transmission only provides a discrete number of fixed gear ratios. In contrast, a CVT provides an infinite number of transmission ratios to generate an output at any speed in its operating range. One example of a CVT is a hydrostatic transmission consisting of a variable speed hydraulic pump and a hydraulic motor. An example of such a hydrostatic transmission is disclosed in U.S. Pat. Nos. 6,385,970 and 6,424,902 to Kuras et al. With this type of transmission, the transmission ratio is adjusted by controlling the displacement of the hydraulic pump. Another example of a CVT is an electric motor and inverter as is used in hybrid-electric cars. In a hybrid-electric system, a gasoline engine is mechanically coupled to an electric generator, which provides electric power to an electric motor. An inverter contains the power electronics that control the output speed and torque of the electric motor—thus the transmission ratio is adjusted electronically by the inverter.

One important function of a transmission is to decrease output speed when the engine picks up a heavy load that causes the engine to lug. For example, if an automobile is driving along a road and suddenly starts climbing a very steep hill, the engine may begin lugging due to the increased load and may eventually stall unless the transmission is downshifted to reduce output speed and increase output torque. If the automobile has a manual transmission, the operator will be required to downshift when he or she senses that the engine is lugging.

U.S. Pat. No. 6,385,970 to Kuras et al. discloses an engine underspeed control system that performs the same function of reducing output speed for a CVT. Specifically, the engine underspeed control system senses when the engine begins lugging and adjusts the transmission ratio of a hydraulic CVT to reduce output speed and increase output torque to prevent the engine from stalling.

Another function of an engine underspeed control system is to adjust the transmission ratio so that the engine is running at an optimal speed condition—i.e., within a range of speeds where the engine is operating most efficiently. The engine underspeed control thus both helps to prevent the engine from stalling when increased loads are encountered and also ensures that the engine is running efficiently.

With work machines, the engine can become loaded much quicker than in an automobile. For example, during slot dozing, a heavy load can be picked up suddenly when the blade is dropped to the ground and begins pushing dirt heavily. When such a heavy load is suddenly encountered, it is important for the engine underspeed control to respond quickly to prevent the engine from stalling.

If an operator requests an excessive increase in machine output speed, the CVT control system may lose its ability to respond quickly to a subsequent request to decrease output speed—the subsequent request to decrease output speed could come from the engine underspeed control or from the operator. More generally, whenever the requested motor speed becomes much greater or lesser than the actual motor speed, the CVT control system may lose responsiveness. This can also cause the engine underspeed control to lose its ability to respond quickly when a heavy load is encountered to prevent the engine from stalling. Furthermore, a request for an excessive increase or decrease in motor speed could cause physical damage to the motor and/or transmission. Thus, what is needed is a system and method for controlling a CVT that maintains responsiveness, prevents damage to the motor and transmission, allows the engine underspeed control to respond rapidly, and allows the transmission ratio to be adjusted smoothly (i.e., without jerking) to keep the engine running at an optimal speed condition. The disclosed system may satisfy one or more of these existing needs.

SUMMARY OF THE INVENTION

In accordance with one aspect of the disclosure, a method of controlling a continuously variable transmission includes sensing an output speed of a motor. An upper speed limit is determined based on the actual motor speed and a positive torque limit associated with the motor. A limited motor speed is determined based on the lesser of a motor speed command and the upper speed limit. The motor is controlled based on the limited motor speed command.

According to another aspect of the present disclosure, a system for controlling a continuously variable transmission includes a power source. A continuously variable transmission is powered by the power source. The continuously variable transmission includes a motor. An electronic controller is operative to (i) determine an upper speed limit based on an actual motor speed and a positive torque limit associated with the motor, (ii) determine a limited motor speed command based on the lesser of a motor speed command and the upper speed limit, and (iii) control the motor based on the limited motor speed command.

According to another aspect of the present disclosure, a system for controlling a continuously variable transmission includes an engine and an electric generator operatively coupled to the engine. A continuously variable transmission is coupled to receive electric power from the electric generator. The continuously variable transmission includes an inverter and an electric motor. An electronic controller is operative to (i) determine an upper speed limit based on an actual motor speed and a positive torque limit associated with the electric motor, (ii) determine a limited motor speed command based on the lesser of a motor speed command and the upper speed limit, and (iii) control the electric motor based on the limited motor speed command.

It is to be understood that both the foregoing general description and the following detailed description are exemplary and explanatory only and are not restrictive of the invention, as claimed.

DETAILED DESCRIPTION

Reference will now be made in detail to the drawings. Whenever possible, the same reference numbers will be used throughout the drawings to refer to the same or like parts.

Figure 1A:
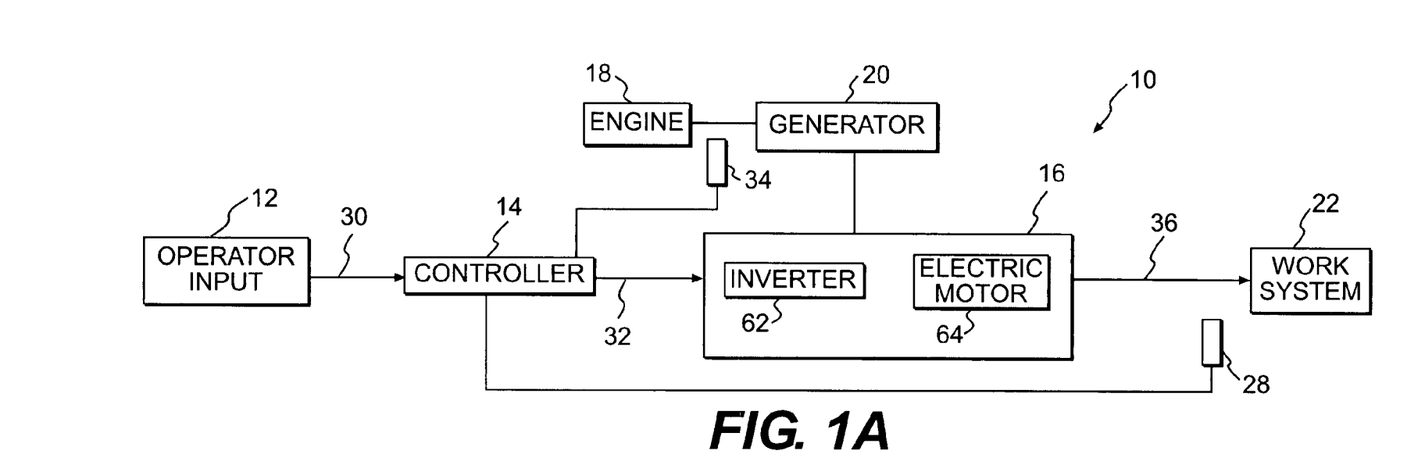
FIG. 1A depicts a block diagram illustrating a continuously variable transmission system as used in a hybrid-electric system in accordance with an exemplary embodiment of the present disclosure.

FIG. 1A depicts a block diagram illustrating one embodiment of a continuously variable transmission system 10 as used in a hybrid-electric system. An operator input 12 provides an input signal 30 to a controller 14. Operator input 12, for example, could be an accelerator pedal that allows the operator to depress the pedal to request an increase in machine output speed. Input signal 30 may represent a requested speed. Alternatively, operator input 12 can provide one or more signals representing some other form of operator request (such as a requested power or requested torque) to controller 14. In that case, controller 14 would then convert the received input signal(s) 30 into a requested speed based on well known equations.

Controller 14 may be implemented as one or more microprocessors. Alternatively, controller 14 may be implemented as an analog or digital electronic circuit, or a combination of one or more microprocessors and other circuitry. Controller 14 converts the input signal 30 into a motor speed command and then converts the motor speed command into a motor torque command 32. These conversions are discussed in more detail below.

Controller 14 outputs the motor torque command 32 to a continuously variable transmission 16, which includes an inverter 62 and an electric motor 64. Inverter 62 contains the power electronics that control the output speed and torque of electric motor 64. The output of continuously variable transmission 16 is a motor output torque 36. Thus, inverter 62 and electric motor 64 convert the motor torque command 32 into a motor output torque 36. The motor output torque 36 is applied to a work system 22. Work system 22 represents the load on the motor—for example, the wheels or tracks used to propel an automobile or work machine.

Continuously variable transmission system 10 also includes an engine 18 that is mechanically coupled to an electric generator 20. Electric generator 20 outputs electric current over an AC or DC bus to provide power to inverter and continuously variable transmission 16. A motor speed sensor 28 senses the output speed of electric motor 64 and provides a signal representing the actual (sensed) motor speed to controller 14. Motor speed refers to the angular speed of rotation of the output shaft of the motor. Motor speed sensor 28 can sense actual motor speed directly at the output of electric motor 64. Alternatively, motor speed sensor 28 can sense the speed of some device downstream of motor 64 such as the output speed of a set of mechanical gears coupled to motor 64 or the output speed of the axles propelling the machine. An engine speed sensor 34 senses the speed of engine 18 and provides a signal representing the actual engine speed to controller 14.

Figure 1B:
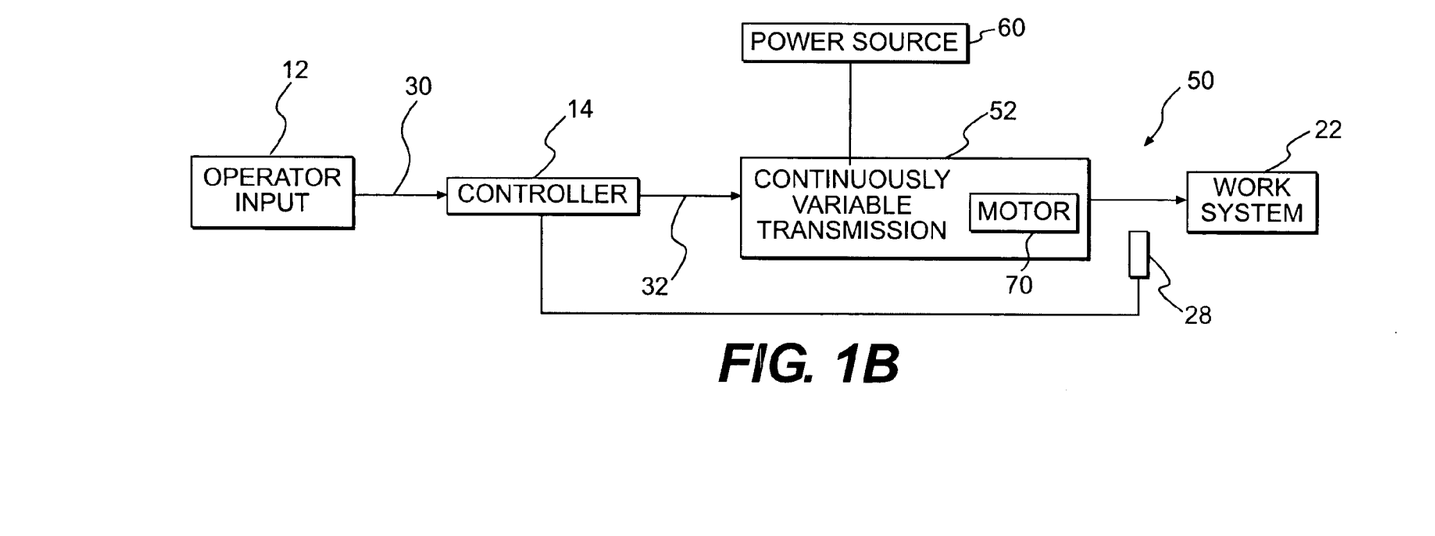
FIG. 1B depicts a block diagram illustrating a more generalized embodiment of a continuously variable transmission system in accordance with the present disclosure.

FIG. 1B depicts a block diagram illustrating a more generalized embodiment of a continuously variable transmission system 50. The embodiment shown in FIG. 1B is similar to the embodiment shown in FIG. 1A, except that the continuously variable transmission 16, engine 18 and generator 20 have been replaced by a more generalized power source 60 and a continuously variable transmission 52. Continuously variable transmission 52 includes within it a motor 70. Continuously variable transmission 52 could be a hydraulic pump and motor, an inverter and electric motor, or any other type of well-known continuously variable transmission. Power source 60 can be an engine, a battery, or any other appropriate power source for supplying energy to the continuously variable transmission 52 to drive work system 22.

Operation of controller 14 will now be explained. Controller 14 determines a motor speed command. The motor speed command represents a requested or desired motor speed. Typically, the motor speed command will be set equal to the input signal 30 received from operator input 12. Alternatively, controller 14 can convert the input signal 30 into the motor speed command by scaling it or performing other well-known processing or conversion operations. Furthermore, the engine underspeed control algorithm (implemented by controller 14) will reduce the motor speed command if the engine begins lugging (e.g., if the engine speed drops below a threshold value). Thus, the motor speed command represents the desired speed of the motor as determined by controller 14.

Controller 14 calculates a motor torque command 32 based on the difference between the motor speed command and the actual motor speed. The motor torque command 32 may be calculated using a proportional and integral (PI) control algorithm. An exemplary control algorithm is provided as follows:

$$\text{Motor Torque Command} = (P + I + D) \cdot Lgain$$

$$P = (\text{Motor Speed } Cmd - \text{Actual Motor Speed}) \cdot Pgain$$
$$= e(t) \cdot Pgain$$

$$I = \int (Igain \cdot (\text{Motor Speed } Cmd - \text{Acutal Motor Speed}) \cdot dt$$
$$= \int Igain \cdot e(t) \cdot dt$$

$$D = 0$$

In the above exemplary algorithm, the derivative term (D term) is not used. If desired, however, the derivative term may also be used by implementing a well-known PID control algorithm instead of a PI control algorithm.

An error signal e(t) is equal to the difference between the motor speed command and the actual (sensed) motor speed received from motor speed sensor 28. As can be seen from the above equations, the motor torque command 32 is based on the error signal e(t). For example, if an electrically powered automobile were driving on a flat surface for a long period of time at 50 mph, and the motor speed command corresponded to an automobile speed of 50 mph, then the error signal e(t) would equal zero (neglecting air resistance and friction for simplification) and the motor torque command 32 would equal zero. If the operator were to request an increase in output speed, controller 14 would accordingly increase the motor torque command 32 to thereby increase output speed.

Figure 2:
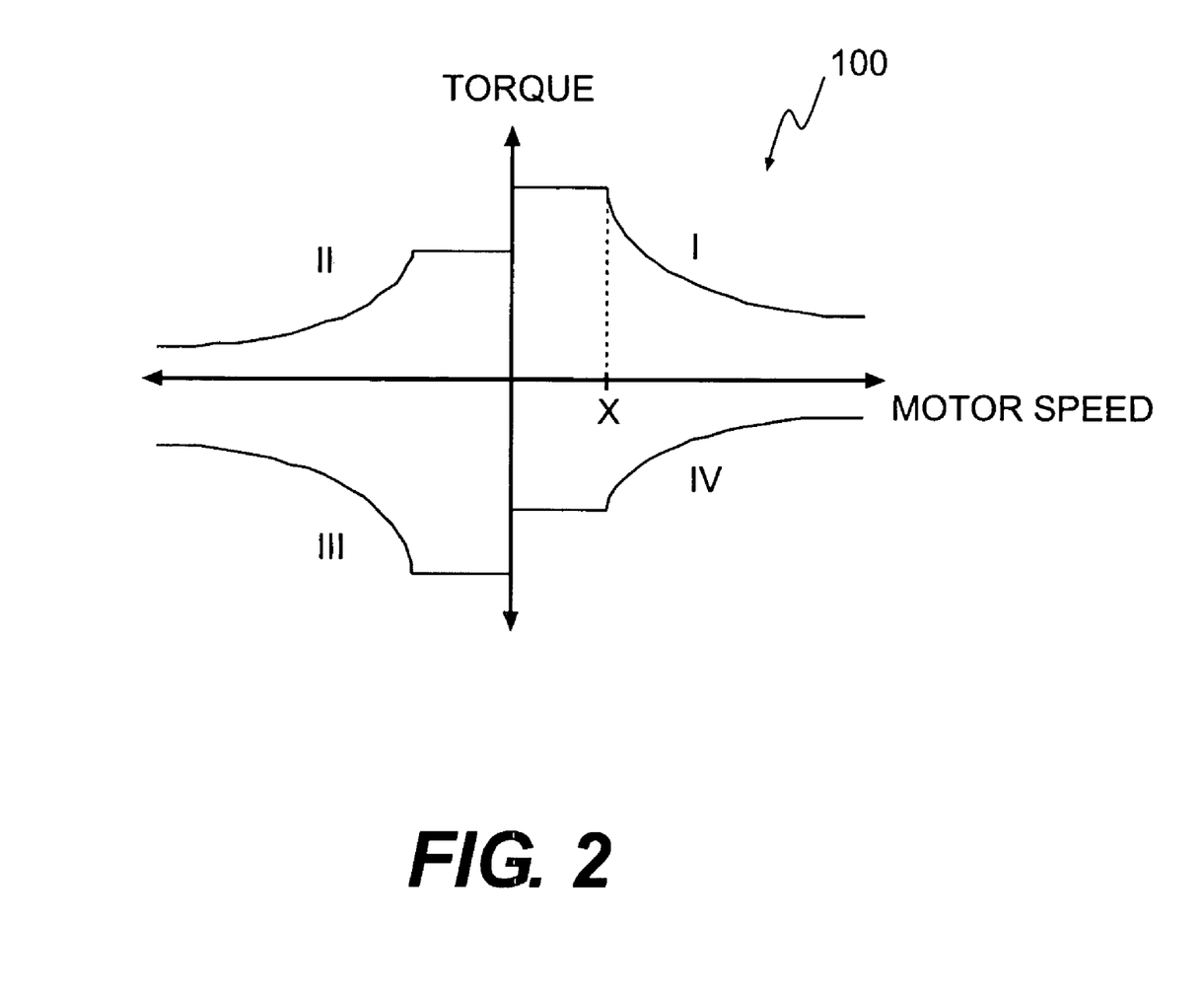
FIG. 2 depicts an example of a set of torque-speed curves for a particular motor.

FIG. 2 depicts an example of a set of torque-speed curves 100 for a motor 70. The x-axis represents motor speed, and the y-axis represents motor torque. The torque-speed curves 100 represent the amount of torque that motor 70 is capable of outputting at a given motor speed. If motor 70 is an electric motor (such as electric motor 64 in FIG. 1A) and is operating in quadrants I and III, motor 70 is acting as a motor, whereas in quadrants II and IV, motor 70 is acting as a generator, outputting electric power back to generator 20. Motor 70 would act as a generator, for example, in an electrically powered automobile when controller 14 reduces speed by applying a negative torque command to slow down motor 70 when it is spinning in a positive direction.

As can be seen in quadrant I, at low speeds, the motor's maximum torque remains constant from a motor speed of zero up to a motor speed of X. For speeds greater than X, the maximum motor torque decreases as motor speed increases. The output power of motor 70 is equal to the motor output torque times the motor speed. For speeds greater than X, motor 70 is said to be operating in the "constant power region." In the constant power region, motor 70 outputs a constant output power when operating at its maximum torque. In other words, when the motor is producing its maximum torque, the motor's power output remains roughly constant as engine speed varies. Thus, as motor speed increases, the motor's maximum output torque decreases to produce a constant output power equal to the motor's rated power.

When motor 70 is operating at very low speeds, it would have to produce a large amount of torque to operate at its rated output power. Such a large amount of torque could cause damage to motor 70 and the transmission. Thus, at speeds lower than X, the motor's output torque is limited to a constant value that is designed to prevent damage to motor 70. When motor 70 is operating at speeds lower than X, it is said to be operating in the "torque limited region" because motor 70 is limited by a constant maximum torque level.

As described above, the motor torque command 32 is a function of the difference between the motor speed command and the actual (sensed) motor speed. Thus, if the operator requests a speed increase, the motor torque command 32 will increase accordingly. The larger the requested speed increase, the larger the motor torque command 32 will be. The motor torque command 32 is applied to motor 70 to accelerate the motor's speed up to the requested motor speed. If the operator were to request a large enough speed increase that would cause the motor torque command to exceed the maximum torque limit of motor 70, however, motor 70 would not be able to provide the necessary torque. Instead, motor 70 would simply provide as much torque as it is capable of outputting at its current speed. Furthermore, such an excessive speed request could also potentially cause damage to motor 70 or to the transmission.

If the motor speed command is allowed to increase beyond the torque capability of motor 70 in this manner (i.e., the resulting motor torque command 32 exceeds the torque limit of motor 70), motor 70 may also lose responsiveness to subsequent changes in the motor speed command. For example, if the operator first requests a large increase in motor speed and then requests a decrease in motor speed, motor 70 may not respond immediately to the request to decrease motor speed. If the first request causes the motor torque command 32 to exceed the torque limit of motor 70, then motor 70 will not respond to the subsequent request to reduce motor speed until the motor torque command 32 drops to a level within the torque capability of motor 70.

A similar problem can occur when the operator requests an excessive decrease in speed that requires a negative motor torque command 32 that exceeds the negative torque limit of motor 70. When the operator or controller 14 subsequently attempts to increase motor speed by increasing the motor speed command, motor 70 will not respond until the motor torque command 32 rises to a level within the torque capability of motor 70.

This problem can also interfere with operation of the engine underspeed control algorithm. If motor 70 suddenly picks up a significant load (for example, a car hits a steep hill, or a bulldozer drops a blade in the ground), the engine speed and motor speed may drop sharply. Once the engine begins lugging (e.g., if the sensed engine speed drops below a threshold value), the engine underspeed control algorithm will try to reduce the motor speed command to prevent the engine from stalling. If the actual motor speed drops significantly below the requested motor speed, however, the engine underspeed control algorithm may lose its ability to quickly reduce motor speed in a controlled manner. This is described in more detail below with respect to FIG. 4 below. It is important for the engine underspeed control system to be able to respond quickly to prevent the engine from stalling, especially in the case of work machines that can quickly pick up heavy loads.

To avoid these problems, the control system implemented by controller 14 prevents the motor speed command from exceeding an upper speed limit and from dropping below a lower speed limit. These limits are calculated such that, as long as the motor speed command 32 remains within the upper and lower speed limits, the motor torque command will stay within the torque capability of motor 70. In this way, motor 70 will remain responsive to subsequent speed change requests.

The upper speed limit is calculated as follows. The motor torque command 32, as explained above, is calculated according to the following equation:

$$\text{Motor Trq Cmd} = [(\text{Motor Spd Cmd} - \text{Actual Motor Spd}) \cdot \text{Pgain} + \text{Iterm}] \cdot \text{Lgain}$$

The upper speed limit is the value of motor speed command that would cause the motor torque command 32 to exceed the torque capability of motor 70 (i.e., the motor torque limit). The motor torque limit at a particular motor speed can be determined from the torque-speed curves 100 for motor 70, as shown in FIG. 2. The upper speed limit can therefore be calculated by substituting the motor torque limit for the motor torque command and the upper speed limit for the motor speed command in the above equation:

$$\text{Motor Trq Limit} = [(\text{Upper Spd Limit} - \text{Actual Motor Speed}) \cdot \text{Pgain} + \text{Iterm}] \cdot \text{Lgain}$$

Solving the above equation for the upper speed limit produces the following equation:

$$\text{Upper Spd Limit} = [(\text{Motor Trq Limit}/\text{Lgain}) - \text{Iterm}]/\text{Pgain} + \text{Actual Motor Spd}$$

This equation will be referred to herein as the "speed limit equation." Motor Trq Limit represents the maximum positive torque limit of motor 70 as shown in quadrants I and II of FIG. 2. Controller 14 can access a look-up table to determine Motor Trq Limit as a function of actual motor speed. The look-up table contains values representing the torque-speed curves 100 shown in FIG. 2. Alternatively, controller 14 can calculate Motor Trq Limit from equations that represent the torque speed curves shown in FIG. 2. Once Motor Trq Limit is determined at a given actual motor speed, the upper speed limit is calculated from the speed limit equation shown above.

Controller 14 may also calculate a lower speed limit in a similar manner using the same speed limit equation as that given above for the upper speed limit. The only difference is that the Motor Trq Limit used in the equation is the negative motor torque limit shown in quadrants III and IV of FIG. 2 rather than the positive motor torque limit. For example, if motor 70 is operating in the forwards direction (e.g., it is propelling an automobile or work machine forwards), the upper speed limit is calculated using the positive motor torque limit obtained from quadrant I of the torque-speed curves 100, whereas the lower speed limit is calculated using the negative motor torque limit obtained from quadrant IV. If motor 70 is operating in the reverse direction, the upper speed limit is calculated using the positive motor torque limit obtained from quadrant II of the torque-speed curves 100, whereas the lower speed limit is calculated using the negative motor torque limit obtained from quadrant III.

The control system implemented by controller 14 prevents the motor speed command from exceeding the upper and lower speed limits. As long as the requested speed remains within the upper and lower speed limits, the motor speed command will be set equal to the requested speed received from the operator or from the engine underspeed control algorithm. If the operator requests a speed in excess of the upper speed limit, the motor speed command will remain pegged at the upper speed limit until the requested speed drops below the upper speed limit. Once the requested speed drops below the upper speed limit, the motor speed command is again set equal to the requested speed. If the operator requests a speed below the lower speed limit, the motor speed command will remain pegged at the lower speed limit until the requested speed rises above the lower speed limit.

As can be seen from FIG. 2, when motor 70 is operating in the constant power region, the motor torque limit will decrease as motor speed increases. If an operator requests an increase in speed, motor 70 will accelerate. As the motor speed increases, the motor torque limit will decrease. Thus, controller 14 must continually determine the motor torque limit and calculate the upper speed limit as a function of the motor torque limit and actual motor speed (using the equation given above).

Figure 3:
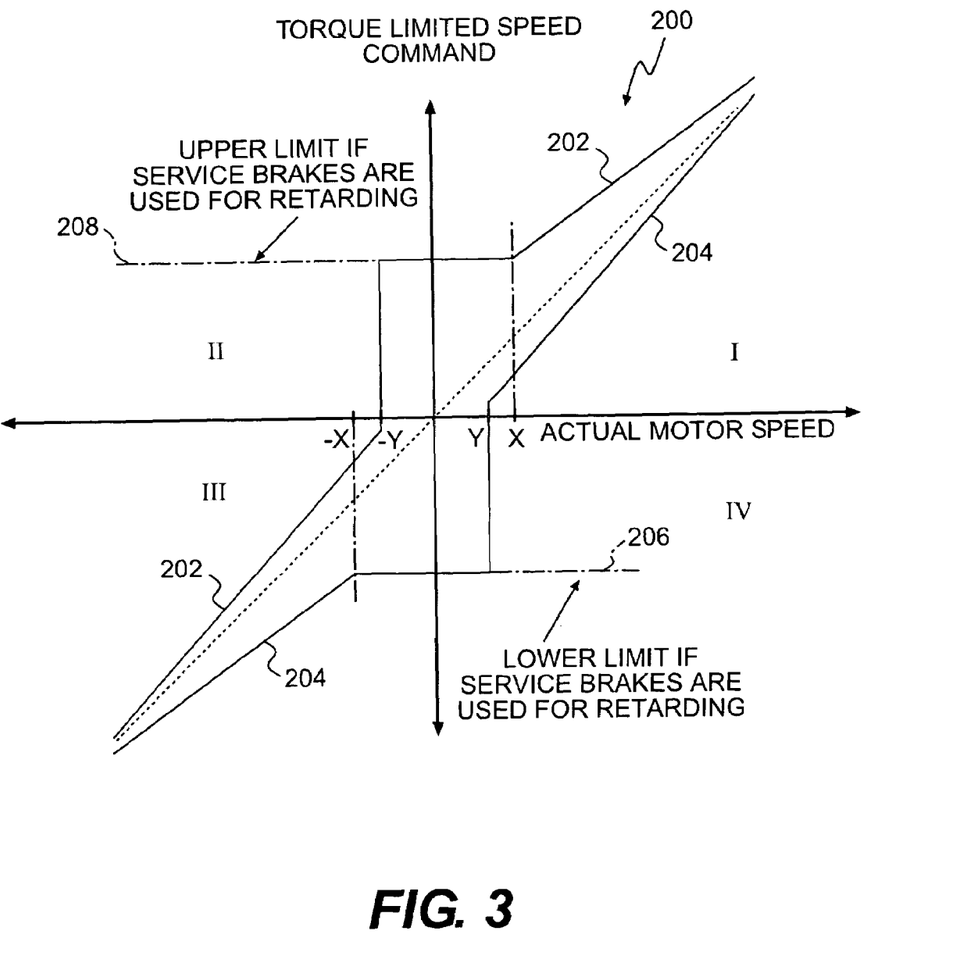
FIG. 3 depicts a graph showing an upper speed limit and lower speed limit as a function of actual motor speed in accordance with an exemplary embodiment of the present disclosure.

FIG. 3 depicts a graph 200 illustrating the upper speed limit 202 and lower speed limit 204 as a function of actual motor speed. The y-axis represents the motor speed command, which is also referred to as the "torque limited speed command" because it is limited by the upper and lower speed limits, which are calculated based on the torque capability of motor 70. The upper speed limit is the maximum motor speed command that will not exceed the positive torque limit of motor 70. The lower speed limit is the minimum speed command that will not exceed the negative torque limit of motor 70.

The torque limited regions are indicated on the x-axis by the labels X and −X. In the constant power regions, the upper and lower speed limits are calculated using the speed limit equation provided above. To improve stability, "plateaus" for the upper and lower speed limits may be implemented in the motor's torque limited region. Specifically, the upper speed limit has a flat plateau between actual motor speeds −Y and X. The lower speed limit has a flat plateau between actual motor speeds −X and Y. Speed Y is a speed which is chosen to be slightly less than speed X. Speed Y is determined empirically to build in natural hysteresis into the control scheme.

In these plateau regions, the upper and lower speed limits are not calculated according to the speed limit equation. Instead, for actual motor speeds between −Y and +X, the upper speed limit is set to a constant value. This constant value is the upper speed limit at actual motor speed X calculated according to the speed limit equation. For actual motor speeds greater than −X and less than Y, the lower speed limit is a constant value equal to the lower speed limit at actual motor speed −X calculated according to the speed limit equation.

Figure 4:
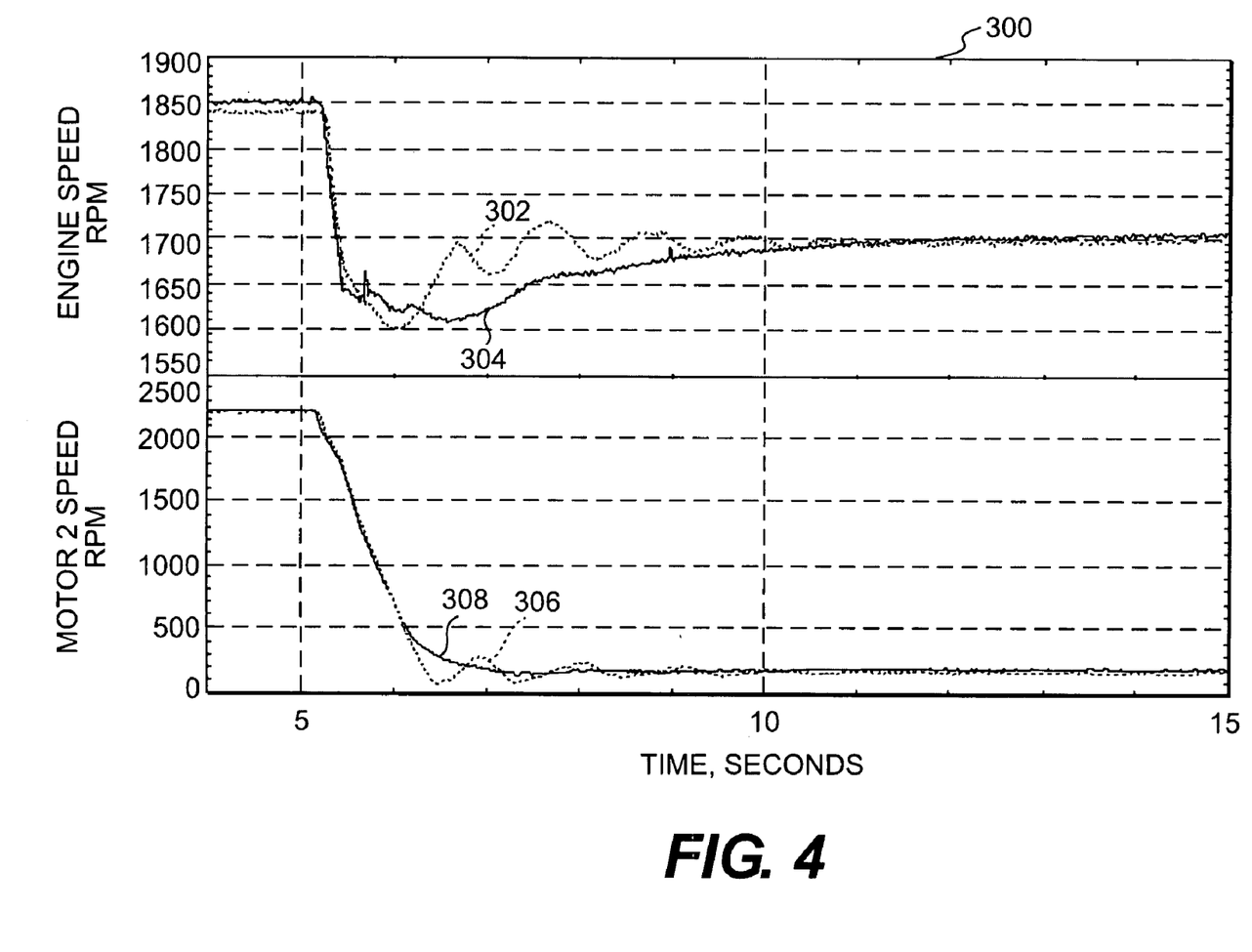
FIG. 4 depicts a graph of test results illustrating how system stability is improved with the implementation of speed limit plateaus in a torque limited region of a motor.

These upper and lower speed limit plateaus in the torque limited region improve stability by reducing undesirable oscillations. FIG. 4 depicts a graph 300 of test results that illustrate how system stability is improved with the implementation of speed limit plateaus in the torque limited region. The upper graph (lines 302 and 304) illustrates engine speed over time and the lower graph (lines 306 and 308) illustrates motor speed over time. Two test runs were performed. In the first test run, the upper and lower speed limits were calculated purely according to the speed limit equation with no plateau implemented in the torque limited region. For this first test run, line 302 illustrates engine speed as a function of time and line 306 illustrates motor speed as a function of time. In the second test run, a plateau was implemented for the upper and lower speed limits in the torque limited region of motor 70, as shown in FIG. 3. For this second test run, line 304 illustrates engine speed as a function of time and line 308 illustrates motor speed as a function of time.

At time t=0, the engine is running steadily at approximately 1850 rpm and motor 70 is running steadily at approximately 2200 rpm. The controller 14 is receiving a motor speed command of 2200 rpm. Shortly after time t=5 seconds, motor 70 is hit with a heavy load. This causes motor 70 and engine speed to slow down sharply. The actual motor speed drops significantly below the motor speed command causing the motor speed command to become limited by the upper speed limit. Once the engine speed drops below approximately 1700 rpm, the engine underspeed control algorithm activates to further reduce the motor speed command to prevent the engine from stalling. Eventually, the engine settles out at a steady 1700 rpm and motor 70 settles out at approximately 200 rpm.

As can be seen by comparing lines 304 and 308 with lines 302 and 306, the use of the speed limit plateaus in the torque limited region of motor 70 reduces undesirable speed oscillations of the engine. These oscillations are caused by fluctuations in the actual motor speed. Because the calculated upper and lower speed limits are a function of actual motor speed, the upper and lower speed limits will oscillate when actual motor speed oscillates. This causes the oscillatory response shown in lines 302 and 306.

In the constant power region, motor 70 is less susceptible to oscillation and instability because variations in actual motor speed are counterbalanced by offsetting changes in motor torque. Specifically, in the constant power region, when motor 70 is producing its maximum torque and the motor speed increases, the torque on motor 70 will drop. When the motor speed decreases, the torque on motor 70 will increase. This increase and decrease in torque on motor 70 counterbalances the changes in motor speed. This has the effect of reducing instability and oscillation. Because this counterbalancing does not occur in the torque limited region of motor 70, the speed limit plateaus in the torque limited region help to reduce the undesirable oscillations.

One of the important advantages provided by the upper and lower speed limits is that they may help improve the performance of the engine underspeed control. As shown in FIG. 4, when motor 70 picks up a heavy load suddenly, the motor speed and engine speed drop sharply. If the speed limits are not used to limit the motor speed command, then the engine underspeed control will not respond rapidly. In other words, the engine underspeed control will attempt to reduce the motor speed command, but there will be no effect on motor 70 until the motor speed command drops below the upper speed limit. Thus, by limiting the motor speed command to the upper speed limit, the responsiveness of the engine underspeed control is maintained.

Thus, one of the purposes of the upper and lower speed limits is to help the engine underspeed control to respond quickly to prevent the engine from stalling in the event a heavy load is picked up suddenly. It should be noted that the upper speed limit in the plateau region will exceed the upper speed limit that would be calculated according to the speed limit equation. Even so, the engine underspeed control algorithm will still be able to operate effectively to prevent the engine from stalling when a load is picked up. This is because in the torque limited region of motor 70, the motor's output power will drop off as motor speed decreases. Because motor power is dropping off as speed decreases, the engine is not as likely to stall. Thus, the increased upper speed limit provided by the plateau will not hinder the operation of the engine underspeed control algorithm. Furthermore, controller 14 will prevent the motor torque command 32 from exceeding the maximum torque limit of the motor.

Motor speed X shown in FIG. 3, the speed at which the speed limit plateau begins in quadrants I and III, may be chosen to be slightly less than the speed that marks the transition between the torque limited region and the constant power region (the motor speed labeled 'X' in FIG. 2). This has been found to produce a desirable stability. The desirable value of X can be determined empirically.

An alternative lower speed limit can be used in quadrant IV and an alternative upper speed limit can be used in quadrant II if service brakes are used for retarding. Referring again to FIG. 3, line 204 represents the lower speed limit of motor 70 if the motor speed command is the only mechanism used for slowing down motor 70. Reducing motor speed by reducing the motor speed command is analogous to downshifting to reduce the speed of an automobile. If service brakes are also used to slow down motor 70, then the lower speed limit can be lowered to line 206 in quadrant IV—in other words, the lower plateau region extends throughout all of quadrant IV. The alternative lower speed limit can be used because the service brakes can assist the transmission in slowing down motor 70, reducing the torque on motor 70. Similarly, if motor 70 is operating in reverse, upper speed limit 208 is used in quadrant II—the plateau region extends throughout quadrant II.

INDUSTRIAL APPLICABILITY

Figure 5:
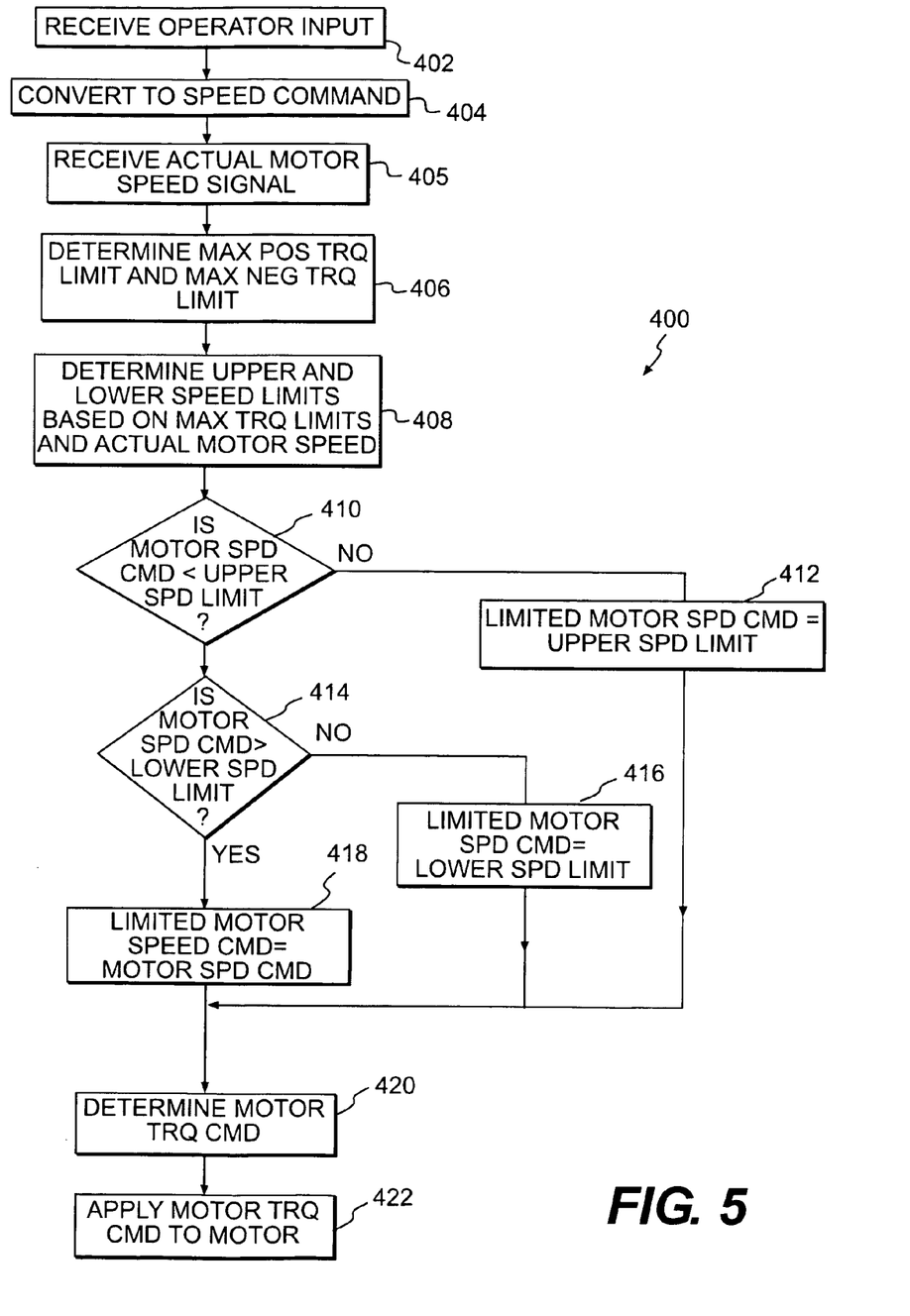
FIG. 5 depicts a flowchart illustrating a method of controlling a continuously variable transmission in accordance with an exemplary embodiment of the present disclosure.

FIG. 5 depicts a flowchart 400 illustrating an exemplary method of controlling a continuously variable transmission. According to this method, a motor speed command represents the desired motor speed. A limited motor speed command is determined that represents the motor speed command, as limited by the upper and lower speed limits.

In step 402, a signal is received from an operator input. In step 404, a motor speed command is determined based on the signal (30, FIGS. 1A and 1B) received from the operator input. The motor speed command represents the requested motor speed. In step 405, an actual motor speed signal is received from a motor speed sensor 28. In step 406, the controller 14 determines the maximum positive and negative torque limits for motor 70. The maximum positive and negative torque limits will be a function of actual motor speed (as shown in FIG. 2). The maximum positive and negative torque limits could also be a function of other parameters such as motor inverter temperature, motor windings temperature, engine operating mode, and so forth. The controller can determine the maximum positive and negative torque limits by accessing a look-up table or using equations, as described previously.

In step 408, the controller determines upper and lower speed limits based on the maximum positive and negative torque limits of motor 70, respectively, and based on the actual motor speed signal. In the constant power region, the upper and lower speed limits are calculated according to the speed limit equation. In the torque limited region, the upper and lower speed limits are determined by the plateau value shown in FIG. 3, as described previously. In step 410, the controller determines if the motor speed command is less than the upper speed limit. If NO, then in step 412, the limited motor speed command is set equal to the upper speed limit. If YES in step 410, then in step 414, the controller determines if the motor speed command is greater than the lower speed limit. If NO, then in step 416, then the limited motor speed command is set equal to the lower speed limit. If YES in step 414, then in step 418, the limited motor speed command is set equal to the motor speed command.

In step 420, the motor torque command is determined based on the limited motor speed command and the actual motor speed signal. In step 422, the motor torque command is applied to the motor controller that controls motor 70 to provide the requested output torque.

The following exemplary software code represents the method described above:

```
If(Act_Spd <=X && Act_Spd >= -Y)
    Upper_Spd_Lim = T_Lim_Pos_Shelf/(P_gain · L_gain) + X
Else
    Upper_Spd_Lim = T_Lim_Pos/(P_gain · L_gain) + Act_Spd
If(Act_Spd <=Y && Act_Spd >= -X)
    Lower_Spd_Lim = T_Lim_Neg_Shelf/(P_gain · L_gain) + (-X)
Else
    Lower_Spd_Lim = T_Lim_Neg/(P_gain · L_gain) + Act_Spd
If(Limit_Flag = = ON)
    {
    If(Motor_Spd_Cmd > Upper_Spd_Lim)
        {
        Limited_Spd_Cmd = Upper_Spd_Lim;
        Motor_Spd_Cmd_Last = Upper_Spd_Lim;
        }
    Else if(Motor_Spd_Cmd<Lower_Spd_Lim)
        {
        Limited_Spd_Cmd=Lower_Spd_Lim;
        Motor_Spd_Cmd_Last = Lower_Spd_Lim;
        }
    Else
        {
        Limited_Spd_Cmd = Motor_Spd_Cmd;
        }
    }
Else
    {
    Limited_Spd_Cmd = Motor_Spd_Cmd;
    }
```

The torque variables T_Lim_Pos_Shelf, T_Lim_Neg_Shelf, T_Lim_Pos, and T_Lim_Neg can be obtained from the torque speed curves 100 shown in FIG. 2. Specifically, T_Lim_Pos_Shelf represents the maximum positive torque limit in the torque limited region of motor 70 in quadrant I. T_Lim_Neg_Shelf represents the maximum negative torque limit of the torque limited region in quadrant III. T_Lim_Pos, which is a function of actual motor speed, represents the maximum positive torque limit in the constant power region shown in quadrants I and II. T_Lim_Neg, also a function of actual motor speed, represents the maximum negative torque limit in the constant power region shown in quadrants III and IV. X represents the actual motor speed that marks the end of the plateau region in quadrant I. Y represents the actual motor speed that marks the end of the plateau region in quadrant IV, Actual motor speeds X and Y are labeled on the graph in FIG. 3.

An example of operation of the above software code is provided as follows. Initially, Motor_Spd_Cmd (i.e., the requested motor speed) is 1500 rpm. The actual motor speed is 1000 rpm. P_gain equals 2 and L_gain=1. The plateau begins at speed X=500 rpm. For simplicity of this example, the I term and I_Gain will be set to zero.

Controller 14 first determines that motor 70 is operating above speed X. Controller 14 then accesses a look-up table to determine that T_Lim_Pos at 1000 rpm is equal to 200 Nm. Upper_Spd_Lim=T_Lim_Pos/2+Actual_Spd=1100. Because the Motor_Spd_Cmd exceeds the Upper_Spd_Lim, the Limited_Spd_Cmd will be set equal to the Upper_Spd_Lim. The Motor_Trq_Cmd=(Limited_Spd_Cmd−Act_Spd)· P_gain=(1100−1000)·2=200 Nm, which is equal to the positive torque limit of motor 70 T_Lim_Pos.

The disclosed system and method for controlling a continuously variable transmission sets upper and lower speed limits that enable the CVT to respond quickly to changes in the motor speed command. The upper and lower speed limits also prevent damage to the motor and transmission, allow the engine underspeed control algorithm to respond rapidly, and allow the transmission ratio to be adjusted smoothly without jerking.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A method of controlling a continuously variable transmission, comprising:
   sensing an output speed of a motor;
   determining an upper speed limit based on the output speed of the motor and a positive torque limit associated with the motor;
   determining a limited motor speed command based on the lesser of a motor speed command and the upper speed limit; and
   controlling the motor based on the limited motor speed command.

2. The method of claim 1, further comprising:
   receiving an input signal from an operator representative of a requested speed; and
   determining the motor speed command based on the input signal received from the operator.

3. The method of claim 1, wherein the determining of the upper speed limit includes accessing a look-up table to determine the positive torque limit as a function of the output speed of the motor.

4. The method of claim 1, wherein for an actual motor speed less than X and greater than −Y, the upper speed limit is a constant value.

5. The method of claim 4, wherein X is chosen to be slightly less than an actual motor speed that marks a transition between the constant power region of the motor and a torque limited region of the motor.

6. The method of claim 1, further comprising:
   sensing an output speed of an engine and producing an engine speed signal indicative of the engine speed; and
   reducing the limited motor speed command when the engine speed signal drops below a threshold value.

7. A method of controlling a continuously variable transmission, comprising:
   sensing an output speed of a motor;
   determining an upper speed limit based on the output speed of the motor and a positive torque limit associated with the motor;
   determining a limited motor sneed command based on the lesser of a motor speed command and the upper speed limit;
   controlling the motor based on the limited motor speed command;
   determining a lower speed limit based on the output speed of the motor and a negative torque limit of the motor, wherein the determining of the limited motor speed command includes:
      setting the limited motor speed command equal to the upper speed limit, if the motor speed command is equal to or greater than the upper speed limit;
      setting the limited motor speed command equal to the motor speed command, if the motor speed command is less than the upper speed limit and greater than the lower speed limit; and
      setting the limited motor speed command equal to the lower speed limit, if the motor speed command is equal to or less than the lower speed limit.

8. The method of claim 7, wherein the determining of the upper and lower speed limits includes selecting an alternate lower speed limit if service brakes are used for retarding and the motor speed is greater than zero, and selecting an alternate upper speed limit if service brakes are used for retarding and the motor speed is less than zero.

9. A method of controlling a continuously variable transmission, comprising:
   sensing an output speed of a motor;
   determining an upper speed limit based on the output speed of the motor and a positive torque limit associated with the motor;
   determining a limited motor speed command based on the lesser of a motor speed command and the upper speed limit; and
   controlling the motor based on the limited motor speed command;
   wherein the controlling of the motor based on the limited motor speed command includes calculating a motor torque command based on a difference between the limited motor speed command and the output speed of the motor, and controlling the motor based on the motor torque command.

10. The method of claim 9, wherein the calculation of the motor torque command is performed by a proportional and integral (PI) control algorithm.

11. The method of claim 9, wherein the upper speed limit is calculated as a value of the motor speed command that will cause the motor torque command to equal the positive torque limit of the motor.

12. The method of claim 11, wherein the upper speed limit is calculated according to:

Upper Spd Limit=[(Motor Trq Limit/Lgain)−Iterm]/Pgain+Actual Motor Spd, wherein Iterm=∫(Igain·(Motor Speed Cmd−Actual Motor Speed)·dt, wherein Motor Trq Limit is the positive motor torque limit, Motor Speed Cmd is the motor speed command, and wherein Lgain, Pgain, and Igain are constants.

13. A method of controlling a continuously variable transmission, comprising:

sensing an output speed of a motor;

determining an upper speed limit based on the output speed of the motor and a positive torque limit associated with the motor;

determining a limited motor speed command based on the lesser of a motor speed command and the upper speed limit; and controlling the motor based on the limited motor speed command;

wherein for an actual motor speed less than X and greater than −Y, the upper speed limit is a constant value, wherein the constant value is equal to (T_Lim_Pos_Shelf/(Lgain·Pgain)+X), wherein T_Lim_Pos_Shelf is the maximum positive torque limit of the motor in a torque limited region of the motor, and wherein Lgain and Pgain are constants.

14. A method of controlling a continuously variable transmission including a motor, comprising:

determining an upper speed limit based on i) a sensed output speed of the motor, and ii) a positive torque limit associated with the motor; and controlling the motor based on the lesser of a motor speed command and the upper speed limit.

15. A system for controlling a continuously variable transmission, comprising:

a power source;

a continuously variable transmission powered by the power source, the continuously variable transmission including a motor;

an electronic controller operative to (i) determine an upper speed limit based on an actual motor speed and a positive torque limit associated with the motor, (ii) determine a limited motor speed command based on the lesser of a motor speed command and the upper speed limit, and (iii) control the motor based on the limited motor speed command.

16. The system of claim 15, further comprising: a motor speed sensor operatively coupled to sense an output speed of the motor and to provide an actual motor speed signal to the electronic controller.

17. The system of claim 15, wherein the power source is an engine, and further including:

an engine speed sensor operatively coupled to sense an output speed of the engine and to provide an engine speed signal indicative of the engine speed to the electronic controller.

18. The system of claim 15, further comprising:

an electric generator electrically coupled to provide electric power to the continuously variable transmission, wherein the motor is an electric motor.

19. The system of claim 15, wherein the continuously variable transmission is a hydrostatic transmission and the motor is a hydraulic motor.

20. A system for controlling a continuously variable transmission, comprising:

an engine;

an electric generator operatively coupled to the engine;

a continuously variable transmission coupled to receive electric power from the electric generator, the continuously variable transmission including an inverter and an electric motor; and an electronic controller operative to (i) determine an upper speed limit based on an actual motor speed and a positive torque limit associated with the electric motor, (ii) determine a limited motor speed command based on the lesser of a motor speed command and the upper speed limit, and (iii) control the electric motor based on the limited motor speed command.

* * * * *